(12) United States Patent
Tignor et al.

(10) Patent No.: US 6,678,135 B2
(45) Date of Patent: Jan. 13, 2004

(54) MODULE PLUG FOR AN ELECTRONIC TRIP UNIT

(75) Inventors: Michael S. Tignor, Watertown, CT (US); Michael B. Bradley, Farmington, CT (US); LeeAnne Wambolt, Plainville, CT (US); Geoffrey F. Butland, Farmington, CT (US); Michael H. Thomas, Amersfoort (NL); Paul Rajotte, Plainville, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/682,512

(22) Filed: Sep. 12, 2001

(65) Prior Publication Data

US 2003/0048589 A1 Mar. 13, 2003

(51) Int. Cl.$^7$ ................................................ H02J 13/00
(52) U.S. Cl. ..................... 361/93.3; 702/122; 340/10.1; 700/292
(58) Field of Search ............................ 361/93.1, 93.2, 361/93.3; 702/68, 122; 340/3.4, 825.22, 5.8, 825.5, 10.1–10.42; 700/292

(56) References Cited

U.S. PATENT DOCUMENTS

| | | | |
|---|---|---|---|
| 2,340,682 A | 2/1944 | Powell | 200/147 |
| 2,719,203 A | 9/1955 | Gelzheiser et al. | 200/144 |
| 2,937,254 A | 5/1960 | Ericson | 200/114 |
| 3,158,717 A | 11/1964 | Jencks et al. | 200/116 |
| 3,162,739 A | 12/1964 | Klein et al. | 200/88 |
| 3,197,582 A | 7/1965 | Norden | 200/50 |
| 3,307,002 A | 2/1967 | Cooper | 200/116 |
| 3,517,356 A | 6/1970 | Hanafusa | 335/16 |
| 3,631,369 A | 12/1971 | Menocal | 337/110 |
| 3,803,455 A | 4/1974 | Willard | 317/33 SC |
| 3,883,781 A | 5/1975 | Cotton | 317/14 R |
| 4,129,762 A | 12/1978 | Bruchet | 200/153 G |
| 4,144,513 A | 3/1979 | Shafer et al. | 335/46 |
| 4,158,119 A | 6/1979 | Krakik | 200/240 |
| 4,165,453 A | 8/1979 | Hennemann | 200/153 G |
| 4,166,988 A | 9/1979 | Ciarcia et al. | 335/9 |
| 4,220,934 A | 9/1980 | Wafer et al. | 335/16 |
| 4,255,732 A | 3/1981 | Wafer et al. | 335/16 |
| 4,259,651 A | 3/1981 | Yamat | 335/16 |
| 4,263,492 A | 4/1981 | Maier et al. | 200/288 |
| 4,276,527 A | 6/1981 | Gerbert-Gaillard et al. | 335/39 |
| 4,297,663 A | 10/1981 | Seymour et al. | 335/20 |
| 4,301,342 A | 11/1981 | Castonguay et al. | 200/153 SC |

(List continued on next page.)

FOREIGN PATENT DOCUMENTS

| | | |
|---|---|---|
| BE | 819 008 A | 12/1974 |
| DE | 12 27 978 | 11/1966 |
| DE | 30 47 360 | 6/1982 |
| DE | 38 02 184 | 8/1989 |
| DE | 38 43 277 | 6/1990 |

(List continued on next page.)

Primary Examiner—Kim Huynh
(74) Attorney, Agent, or Firm—Cantor Colburn LLP

(57) ABSTRACT

An electronic trip unit for a circuit breaker includes: a microprocessor, the microprocessor programmed to determine an overcurrent condition of the circuit breaker; a nonvolatile memory in electronic communication with the microprocessor; a module plug releasably engaged with the microprocessor, the module plug includes an identification register; wherein the microprocessor reads the identification register, the identification register including an identification number; wherein the microprocessor accesses one of a plurality of programs in the nonvolatile memory based the identification number; and wherein the one of a plurality of programs instructs the microprocessor to perform steps necessary to operate one or more functions of the module plug.

17 Claims, 4 Drawing Sheets

U.S. PATENT DOCUMENTS

| | | | |
|---|---|---|---|
| 4,360,852 A | 11/1982 | Gilmore | 361/98 |
| 4,368,444 A | 1/1983 | Preuss et al. | 335/166 |
| 4,375,021 A | 2/1983 | Pardini et al. | 200/147 B |
| 4,375,022 A | 2/1983 | Daussin et al. | 200/148 R |
| 4,376,270 A | 3/1983 | Staffen | 335/21 |
| 4,383,146 A | 5/1983 | Bur | 200/17 R |
| 4,392,036 A | 7/1983 | Troebel et al. | 200/322 |
| 4,393,283 A | 7/1983 | Masuda | 200/51.09 |
| 4,401,872 A | 8/1983 | Boichot-Castagne et al. | 200/153 G |
| 4,409,573 A | 10/1983 | DiMarco et al. | 335/16 |
| 4,435,690 A | 3/1984 | Link et al. | 335/37 |
| 4,467,297 A | 8/1984 | Boichot-Castagne et al. | 335/8 |
| 4,468,645 A | 8/1984 | Gerbert-Gaillard et al. | 335/42 |
| 4,470,027 A | 9/1984 | Link et al. | 335/16 |
| 4,479,143 A | 10/1984 | Watanabe et al. | 358/44 |
| 4,488,133 A | 12/1984 | McClellan et al. | 335/16 |
| 4,492,941 A | 1/1985 | Nagel | 335/13 |
| 4,541,032 A | 9/1985 | Schwab | 361/331 |
| 4,546,224 A | 10/1985 | Mostosi | 200/153 G |
| 4,550,360 A | 10/1985 | Dougherty | 361/93 |
| 4,562,419 A | 12/1985 | Preuss et al. | 335/195 |
| 4,589,052 A | 5/1986 | Dougherty | 361/94 |
| 4,595,812 A | 6/1986 | Tamaru et al. | 200/307 |
| 4,611,187 A | 9/1986 | Banfi | 335/16 |
| 4,612,430 A | 9/1986 | Sloan et al. | 200/327 |
| 4,616,198 A | 10/1986 | Pardini | 335/16 |
| 4,622,444 A | 11/1986 | Kandatsu et al. | 200/303 |
| 4,631,625 A | 12/1986 | Alexander et al. | 361/94 |
| 4,642,431 A | 2/1987 | Tedesco et al. | 200/153 G |
| 4,644,438 A | 2/1987 | Puccinelli et al. | 361/75 |
| 4,649,247 A | 3/1987 | Preuss et al. | 200/244 |
| 4,649,455 A * | 3/1987 | Scott | 361/787 |
| 4,658,322 A | 4/1987 | Rivera | 361/37 |
| 4,672,501 A | 6/1987 | Bilac et al. | 361/96 |
| 4,675,481 A | 6/1987 | Markowski et al. | 200/144 R |
| 4,682,264 A | 7/1987 | Demeyer | 361/96 |
| 4,689,712 A | 8/1987 | Demeyer | 361/96 |
| 4,694,373 A | 9/1987 | Demeyer | 361/96 |
| 4,710,845 A | 12/1987 | Demeyer | 361/96 |
| 4,717,985 A | 1/1988 | Demeyer | 361/96 |
| 4,733,211 A | 3/1988 | Castonguay et al. | 335/192 |
| 4,733,321 A | 3/1988 | Lindeperg | 361/96 |
| 4,764,650 A | 8/1988 | Bur et al. | 200/153 G |
| 4,768,007 A | 8/1988 | Mertz et al. | 335/202 |
| 4,780,786 A | 10/1988 | Weynachter et al. | 361/87 |
| 4,831,221 A | 5/1989 | Yu et al. | 200/553 |
| 4,833,563 A | 5/1989 | Russell | 361/92 |
| 4,870,531 A | 9/1989 | Danek | 361/93 |
| 4,883,931 A | 11/1989 | Batteux et al. | 200/148 R |
| 4,884,047 A | 11/1989 | Baginski et al. | 335/10 |
| 4,884,164 A | 11/1989 | Dziura et al. | 361/97 |
| 4,900,882 A | 2/1990 | Bernard et al. | 200/147 R |
| 4,910,485 A | 3/1990 | Bolongeat-Mobleu et al. | 335/195 |
| 4,914,541 A | 4/1990 | Tripodi et al. | 361/94 |
| 4,916,420 A | 4/1990 | Bartolo et al. | 335/172 |
| 4,916,421 A | 4/1990 | Pardini et al. | 335/185 |
| 4,926,282 A | 5/1990 | McGhie | 361/102 |
| 4,935,590 A | 6/1990 | Malkin et al. | 200/148 A |
| 4,937,706 A | 6/1990 | Schueller et al. | 361/396 |
| 4,939,492 A | 7/1990 | Raso et al. | 335/42 |
| 4,943,691 A | 7/1990 | Mertz et al. | 200/151 |
| 4,943,888 A | 7/1990 | Jacob et al. | 361/96 |
| 4,950,855 A | 8/1990 | Bolongeat-Mobleu et al. | 200/148 A |
| 4,951,019 A | 8/1990 | Gula | 335/166 |
| 4,952,897 A | 8/1990 | Barnel et al. | 335/147 |
| 4,958,135 A | 9/1990 | Baginski et al. | 335/8 |
| 4,965,543 A | 10/1990 | Batteux | 335/174 |
| 4,983,788 A | 1/1991 | Pardini | 200/16 R |
| 5,001,313 A | 3/1991 | Leclercq et al. | 200/148 B |
| 5,004,878 A | 4/1991 | Seymour et al. | 200/144 R |
| 5,029,301 A | 7/1991 | Nebon et al. | 335/16 |
| 5,030,804 A | 7/1991 | Abri | 200/323 |
| 5,038,246 A * | 8/1991 | Durivage, III | 361/102 |
| 5,057,655 A | 10/1991 | Kersusan et al. | 200/148 B |
| 5,077,627 A | 12/1991 | Fraisse | 361/93 |
| 5,083,081 A | 1/1992 | Barrault et al. | 324/126 |
| 5,095,183 A | 3/1992 | Raphard et al. | 200/148 A |
| 5,103,198 A | 4/1992 | Morel et al. | 335/6 |
| 5,115,371 A | 5/1992 | Tripodi | 361/106 |
| 5,120,921 A | 6/1992 | DiMarco et al. | 200/401 |
| 5,132,865 A | 7/1992 | Mertz et al. | 361/6 |
| 5,138,121 A | 8/1992 | Streich et al. | 200/293 |
| 5,140,115 A | 8/1992 | Morris | 200/308 |
| 5,153,802 A | 10/1992 | Mertz et al. | 361/18 |
| 5,155,315 A | 10/1992 | Malkin et al. | 200/148 R |
| 5,166,483 A | 11/1992 | Kersusan et al. | 200/144 A |
| 5,172,087 A | 12/1992 | Castonguay et al. | 335/160 |
| 5,178,504 A | 1/1993 | Falchi | 411/553 |
| 5,184,717 A | 2/1993 | Chou et al. | 200/401 |
| 5,187,339 A | 2/1993 | Lissandrin | 200/148 F |
| 5,198,956 A | 3/1993 | Dvorak | 361/106 |
| 5,200,724 A | 4/1993 | Gula et al. | 335/166 |
| 5,210,385 A | 5/1993 | Morel et al. | 200/146 R |
| 5,239,150 A | 8/1993 | Bolongeat-Mobleu et al. | 200/148 R |
| 5,260,533 A | 11/1993 | Livesey et al. | 200/401 |
| 5,262,744 A | 11/1993 | Arnold et al. | 335/8 |
| 5,280,144 A | 1/1994 | Bolongeat-Mobleu et al. | 200/148 R |
| 5,281,776 A | 1/1994 | Morel et al. | 200/144 |
| 5,296,660 A | 3/1994 | Morel et al. | 200/146 R |
| 5,296,664 A | 3/1994 | Crookston et al. | 200/401 |
| 5,298,874 A | 3/1994 | Morel et al. | 335/8 |
| 5,310,971 A | 5/1994 | Vial et al. | 200/244 |
| 5,313,180 A | 5/1994 | Vial et al. | 335/16 |
| 5,317,471 A | 5/1994 | Izoard et al. | 361/105 |
| 5,331,500 A | 7/1994 | Corcoles et al. | 361/93 |
| 5,331,501 A * | 7/1994 | Shimp | 324/424 |
| 5,334,808 A | 8/1994 | Bur et al. | 200/50 |
| 5,341,191 A | 8/1994 | Crookston et al. | 335/16 |
| 5,347,096 A | 9/1994 | Bolongeat-Mobleu et al. | 200/148 B |
| 5,347,097 A | 9/1994 | Bolongeat-Mobleu et al. | 200/148 B |
| 5,350,892 A | 9/1994 | Rozier | 200/144 B |
| 5,357,066 A | 10/1994 | Morel et al. | 200/17 R |
| 5,357,068 A | 10/1994 | Rozier | 200/148 R |
| 5,357,394 A | 10/1994 | Piney | 361/72 |
| 5,361,052 A | 11/1994 | Ferullo et al. | 335/172 |
| 5,373,130 A | 12/1994 | Barrault et al. | 200/147 R |
| 5,379,013 A | 1/1995 | Coudert | 335/17 |
| 5,424,701 A | 6/1995 | Castonguay et al. | 335/172 |
| 5,438,176 A | 8/1995 | Bonnardel et al. | 200/400 |
| 5,440,088 A | 8/1995 | Coudert et al. | 200/303 |
| 5,449,871 A | 9/1995 | Batteux et al. | 200/401 |
| 5,450,048 A | 9/1995 | Leger et al. | 335/132 |
| 5,451,729 A | 9/1995 | Onderka et al. | 200/18 |
| 5,457,295 A | 10/1995 | Tanibe et al. | 200/293 |
| 5,467,069 A | 11/1995 | Payet-Burin et al. | 335/42 |
| 5,469,121 A | 11/1995 | Payet-Burin | 335/16 |
| 5,475,558 A | 12/1995 | Barjonnet et al. | 361/64 |
| 5,477,016 A | 12/1995 | Baginski et al. | 200/43.11 |
| 5,479,143 A | 12/1995 | Payet-Burin | 335/202 |
| 5,483,212 A | 1/1996 | Lankuttis et al. | 335/132 |
| 5,485,343 A | 1/1996 | Santos et al. | 361/115 |
| D367,265 S | 2/1996 | Yamagata et al. | D13/160 |
| 5,490,086 A * | 2/1996 | Leone et al. | 188/242 |
| 5,493,083 A | 2/1996 | Olivier | 200/17 R |

| | | | | | | |
|---|---|---|---|---|---|---|
| 5,504,284 A | 4/1996 | Lazareth et al. ............ 200/50 R | EP | 0 291 374 | 11/1988 |
| 5,504,290 A | 4/1996 | Baginski et al. ............. 200/401 | EP | 0 295 155 | 12/1988 |
| 5,510,761 A | 4/1996 | Boder et al. ................. 335/172 | EP | 0 295 158 | 12/1988 |
| 5,512,720 A | 4/1996 | Coudert et al. .............. 200/400 | EP | 0 309 923 | 4/1989 |
| 5,515,018 A | 5/1996 | DiMarco et al. ............... 335/16 | EP | 0 313 106 | 4/1989 |
| 5,519,561 A | 5/1996 | Mrenna et al. .............. 361/105 | EP | 0 313 422 | 4/1989 |
| 5,534,674 A | 7/1996 | Steffens ....................... 218/154 | EP | 0 314 540 | 5/1989 |
| 5,534,832 A | 7/1996 | Duchemin et al. ............. 335/16 | EP | 0 331 586 | 9/1989 |
| 5,534,835 A | 7/1996 | McColloch et al. ......... 335/172 | EP | 0 337 900 | 10/1989 |
| 5,534,840 A | 7/1996 | Cuingnet ........................ 337/1 | EP | 0 342 133 | 11/1989 |
| 5,539,168 A | 7/1996 | Linzenich .................... 200/303 | EP | 0 367 690 | 5/1990 |
| 5,543,595 A | 8/1996 | Mader et al. ................. 200/401 | EP | 0 371 887 | 6/1990 |
| 5,552,755 A | 9/1996 | Fello et al. ..................... 335/18 | EP | 0 375 568 | 6/1990 |
| 5,581,219 A | 12/1996 | Nozawa et al. .............. 335/132 | EP | 0 394 144 | 10/1990 |
| 5,596,263 A * | 1/1997 | Zavis et al. .................. 323/255 | EP | 0 394 922 | 10/1990 |
| 5,604,656 A | 2/1997 | Derrick et al. ............... 361/187 | EP | 0 399 282 | 11/1990 |
| 5,608,367 A | 3/1997 | Zoller et al. ................. 335/132 | EP | 0 407 310 | 1/1991 |
| 5,687,063 A * | 11/1997 | Chabert ....................... 361/726 | EP | 0 452 230 | 10/1991 |
| 5,784,233 A | 7/1998 | Bastard et al. ................. 361/36 | EP | 0 555 158 | 8/1993 |
| 6,169,651 B1 * | 1/2001 | Dias ............................ 361/206 | EP | 0 560 697 | 9/1993 |
| 6,217,370 B1 | 4/2001 | Scheel et al. ............... 439/483 | EP | 0 567 416 | 10/1993 |
| | | | EP | 0 595 730 | 5/1994 |
| | | | EP | 0 619 591 | 10/1994 |

FOREIGN PATENT DOCUMENTS

| | | |
|---|---|---|
| DE | 44 19 240 | 1/1995 |
| EP | 0 061 092 | 9/1982 |
| EP | 0 064 906 | 11/1982 |
| EP | 0 066 486 | 12/1982 |
| EP | 0 076 719 | 4/1983 |
| EP | 0 117 094 | 8/1984 |
| EP | 0 140 761 | 5/1985 |
| EP | 0 174 904 | 3/1986 |
| EP | 0 196 241 | 10/1986 |
| EP | 0 224 396 | 6/1987 |
| EP | 0 235 479 | 9/1987 |
| EP | 0 239 460 | 9/1987 |
| EP | 0 258 090 | 3/1988 |
| EP | 0 264 313 | 4/1988 |
| EP | 0 264 314 | 4/1988 |
| EP | 0 283 189 | 9/1988 |
| EP | 0 283 358 | 9/1988 |
| EP | 0 665 569 | 8/1995 |
| EP | 0 700 140 | 3/1996 |
| EP | 0 889 498 | 1/1999 |
| FR | 2 410 353 | 6/1979 |
| FR | 2 512 582 | 3/1983 |
| FR | 2 553 943 | 4/1985 |
| FR | 2 592 998 | 7/1987 |
| FR | 2 682 531 | 4/1993 |
| FR | 2 697 670 | 5/1994 |
| FR | 2 699 324 | 6/1994 |
| FR | 2 714 771 | 7/1995 |
| GB | 2 233 155 | 1/1991 |
| WO | 92/00598 | 1/1992 |
| WO | 92/05649 | 4/1992 |
| WO | 94/00901 | 1/1994 |

\* cited by examiner

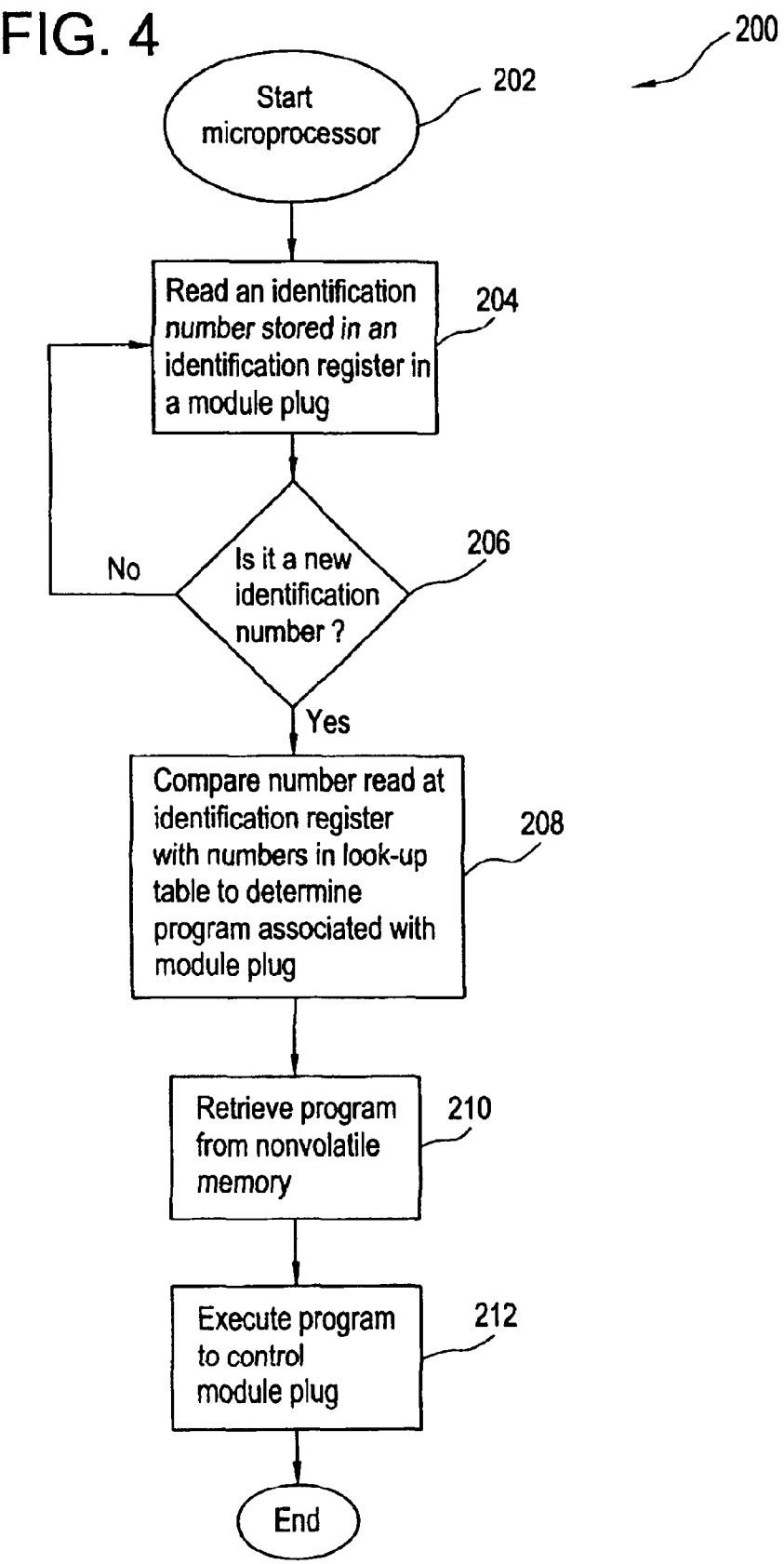

MODULE PLUG FOR AN ELECTRONIC TRIP UNIT

BACKGROUND OF INVENTION

Electronic trip units (trip units) for actuating the separable contacts in a circuit breaker are well known. An electronic trip unit typically comprises voltage and current sensors that provide analog signals indicative of current or voltage in a power distribution circuit. The analog signals are converted by an A/D (analog/digital) converter to digital signals that are processed by a microcontroller. The trip unit further includes RAM (random access memory), ROM (read only memory) and EEPROM (electronic erasable programmable read only memory) all of which interface with the microcontroller. The ROM includes trip unit application code, e.g., main functionality trip setting values, including initializing parameters, boot code, and operational parameters (e.g., trip setting instructions). Operational parameters for the application code are also stored in the EEPROM. An output of the electronic trip unit actuates a trip module, such as a solenoid, that trips a mechanical operating mechanism. The mechanical operating mechanism, in turn, separates a pair of main contacts within the circuit breaker. When the contacts open, circuit current is prevented from flowing from one contact to the other, and electrical current is prevented from flowing to a load that is connected to the breaker. The electronic trip unit initiates a trip for instantaneous, short time, long time, ground fault, and manual conditions.

Circuit breakers having electronic trip units are described in U.S. Pat. No. 4,672,501 entitled "Circuit Breaker and Protective Relay Unit". Such trip units often include a specific interface for a specific plug in module. One such example of a specific interface is a keypad along with a display for accessing the processor and for entering and changing the trip unit settings as described within U.S. Pat. No. 4,870,531 entitled "Circuit Breaker With Removable Display & Keypad". Other functional modules cannot be plugged into the place where this specific plug is received within the electronic trip unit. Thus, in order for the operator to receive additional functions for the trip unit, the operator would have to order the additional functions prior to the electronic trip unit being shipped to the operator. The operator could not install these additional functions in the field.

SUMMARY OF INVENTION

The above discussed and other drawbacks and deficiencies of the prior art are overcome or alleviated by a module plug for an electronic trip unit. In an exemplary embodiment of the invention, an electronic trip unit for a circuit breaker includes: a microprocessor, the microprocessor programmed to determine an overcurrent condition of the circuit breaker; a nonvolatile memory in electronic communication with the microprocessor; a module plug releasably engaged with the microprocessor, the module plug includes an identification register; wherein the microprocessor reads the identification register, the identification register including an identification number; wherein the microprocessor accesses one of a plurality of programs in the nonvolatile memory based the identification number; and wherein the one of a plurality of programs instructs the microprocessor to perform steps necessary to operate one or more functions of the module plug.

BRIEF DESCRIPTION OF DRAWINGS

Referring to the exemplary drawings wherein like elements are numbered alike in the several Figures:

FIG. 4 is a flow chart providing an operation of the module plug and the electronic trip unit of FIG. 2.

DETAILED DESCRIPTION

Figure 1:
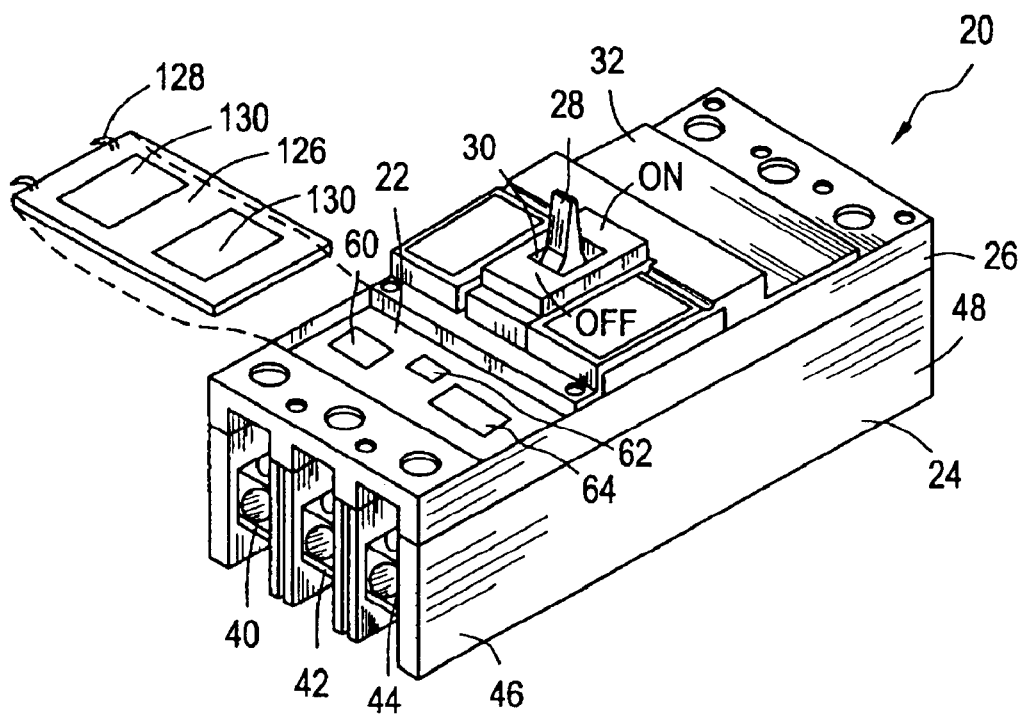
FIG. 1 is a perspective view of a circuit breaker including an electronic trip unit with a module plug.

Referring to FIG. 1, a molded case circuit breaker 20 employing an electronic trip unit 22 is generally shown. Circuit breakers of this type have an insulated case 24 and a mid-cover 26 that house the components of circuit breaker 20. A handle 28 extending through an aperture 30 of a cover 32 gives the operator the ability to turn circuit breaker 20 "on", which allows electricity to flow through circuit breaker 20, turn circuit breaker 20 "off", which prevents electricity from flowing through circuit breaker 20, or "reset" circuit breaker 20 after a fault. A plurality of electrically conducting load side contact straps (load straps) 40, 42, and 44 at a load side 46 of circuit breaker 20 extend within case 24. Line side contact straps 50, 52, 54 (shown on FIG. 3) are located on a line side 48 of circuit breaker and also extend within case 24. Circuit breaker 20 illustrates a typical three-phase configuration, however, the present disclosure is not limited to this configuration but may be applied to other configurations, such as one, two or four phase circuit breakers. Removably disposed at electronic trip unit 22 is a module plug 60, as will be described in further detail hereinafter.

Electronic trip unit 22 also includes a cover 126 that has transparent windows 130 that enables the operator to view module plug 60 without removing cover 126. Module plug 60 is flush with the face of electronic trip unit 22 so that cover 126 can be closed with module plug 60 in place in electronic trip unit 22. Preferably, cover 126 has hinges 128 so that cover can be swung open and the operator may easily access module plug 60. Cover 126 may also be locked to prevent tampering by unauthorized personnel.

Figure 2:
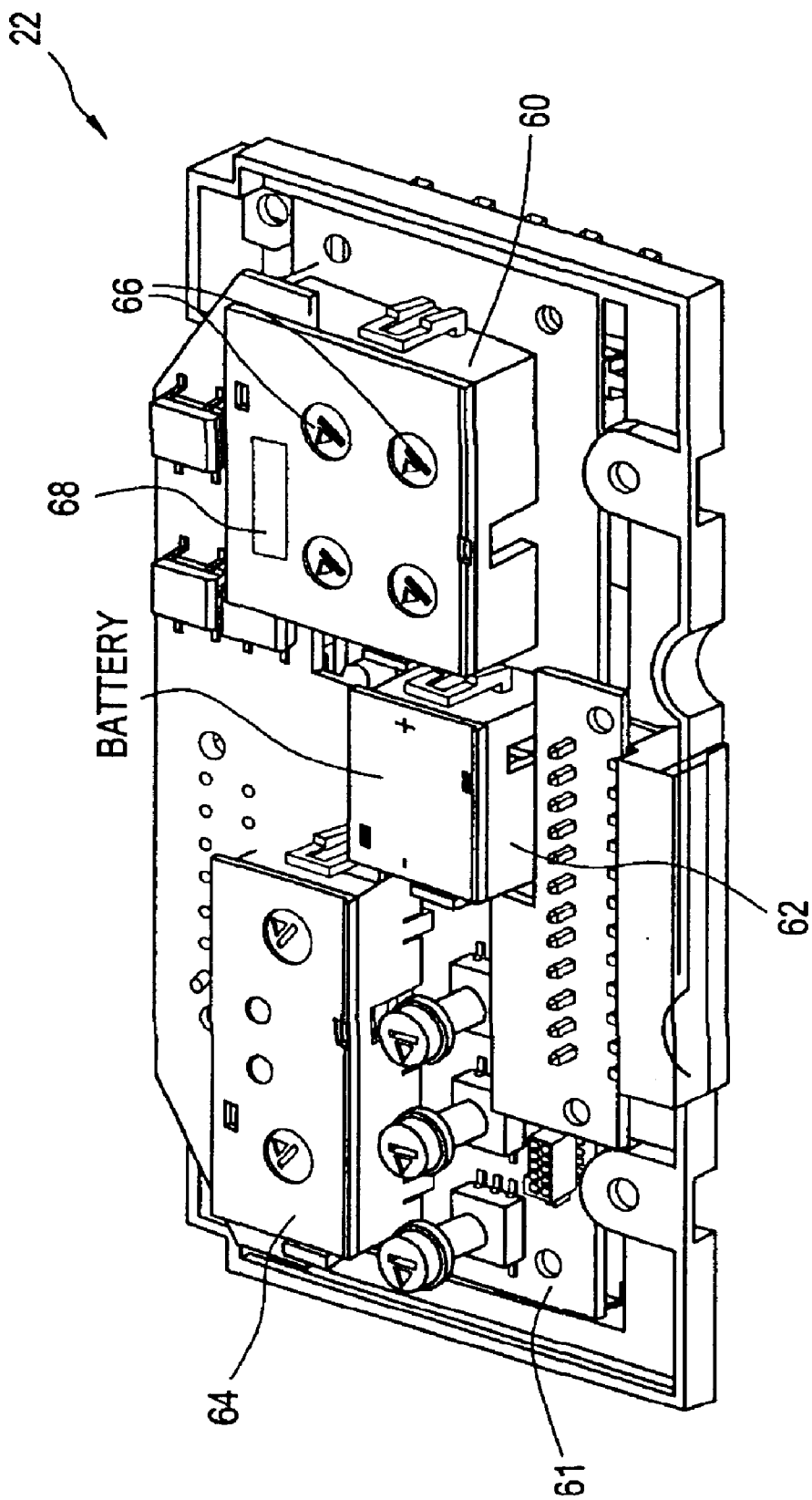
FIG. 2 is the electronic trip unit with the module plug of FIG. 1.

FIG. 2 illustrates electronic trip unit 22 removed from circuit breaker 20. Electronic trip unit 22 includes a printed circuit board 61 to which a plug-in battery 62, a plug-in rating plug 64, and module plug 60 are removably mounted. Rating plug 64 allows the circuit interruption rating to be set by replacing rating plug 64 with a different rating plug. For instance, rating plug 64 may be used to set circuit breaker at 800 amperes maximum current. Rating plug 64 may be subsequently changed to set the maximum rating to 1200 amperes. Battery 62 supplies either a primary source or an alternative source of power to electronic trip unit 22.

Module plug 60 is a small electronic assembly, which may be approximately one inch square and approximately about one-half inch deep. Module plug 60 provides for an operator interface in the form of dials 66, push buttons (not shown), rotary switches (not shown), and the like. Module plug 60 may also include an LCD or LED display 68 that provides the operator with information regarding circuit breaker 20 (shown in FIG. 1) (e.g., whether the circuit breaker is on, off, or tripped), or electronic trip unit 22 (e.g., the trip setting), or the power distribution circuit to which circuit breaker 20 (shown in FIG. 1) is connected (e.g., voltage, power, or current). Module plug 60, battery 62, and rating plug 64 each include a means for removably connecting to printed circuit board 61. Such means includes a pin connector 69 (shown on FIG. 3), an input/output port (not shown), or the like.

Figure 3:
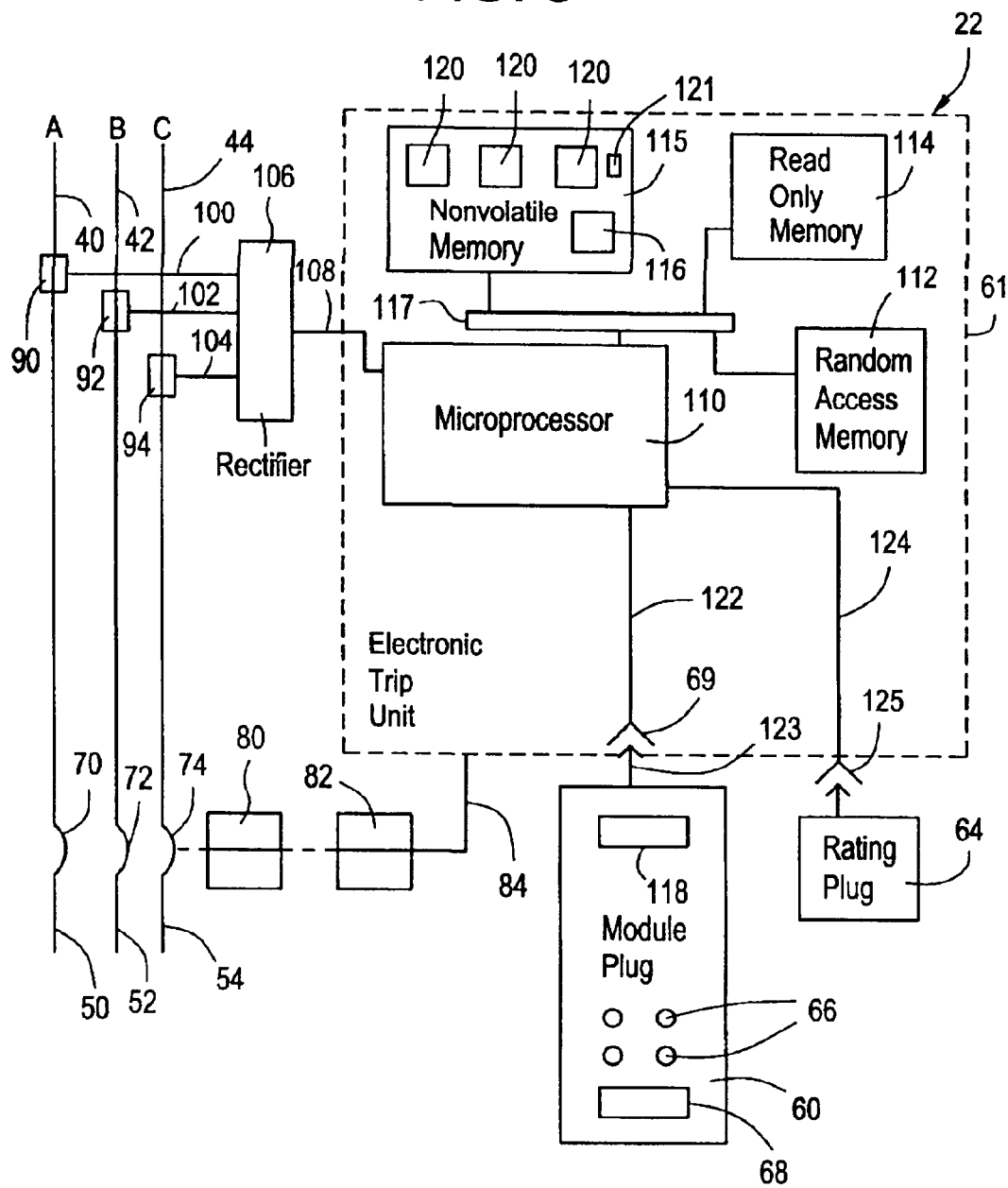
FIG. 3 is a schematic block diagram of the electronic trip unit with the module plug of FIG. 2 in the circuit breaker of FIG. 1.

Referring to FIG. 3, a general schematic of a portion of circuit breaker 20 is shown. In circuit breaker 20, load straps 40, 42, and 44 are electrically connected to line straps 50, 52, and 54 via electrical contacts 70, 72, 74. Electrical contacts 70, 72, and 74 are arranged so that each electrical contact 70, 72, and 74 can be separated to stop the flow of electrical current from line straps 50, 52, and 54 to load straps 40, 42, and 44. Electrical contacts 70, 72, and 74 are mechanically connected to an operating mechanism 80, which is a spring-loaded latching mechanism for separating contacts 70, 72, and 74. A trip actuator 82 is positioned to trip (unlatch) operating mechanism 80 in response to receiving an electrical trip signal from electronic trip unit 22 via line 84. When operating mechanism 80 is tripped by trip actuator 82, operating mechanism 80 separates each electrical contact 70, 72, and 74 to stop the flow of electrical current from line straps 50, 52, and 54 to load straps 40, 42, and 44.

Load straps 40, 42, and 44 are configured for electrical connection to a three-phase power source exemplified by phases A, B, and C. Load straps 40, 42, and 44 are coupled to current transformers 90, 92, 94, respectively, which are then connected by lines 100, 102, and 104 to a rectifier 106. Rectifier 106 is electrically connected by line 108 to a microprocessor 110 mounted to printed circuit board 61 of electronic trip unit 22.

Electronic trip unit 22 includes microprocessor 110, a random access memory (RAM) 112, a read only memory (ROM) 114, and a nonvolatile memory 115. RAM 112 is coupled with microprocessor via a bus 117 and is used for the temporary storage of current and voltage data and as a scratch pad memory. ROM 115 is coupled with microprocessor via bus 117 and contains boot code data. Nonvolatile memory 115 is also coupled with microprocessor via bus 117 and stores a control program 116 that instructs microprocessor 112 to perform certain functions such as overcurrent protection, metering, protective relaying and communications. Nonvolatile memory 115 also stores a plurality of programs 120 that implement module plug 60 functions and a look-up table 121 that maps each program 120 with a corresponding module plug identification number. Microprocessor 110 controls RAM 112, ROM 114, nonvolatile memory 115, and bus 117.

Electronic trip unit 22 is coupled with module plug 60 by pin connector 69. Pin connector 69 is coupled with microprocessor 110 by a lead 122. Module plug 60 includes an identification register 118, dials 66, and display 68, all of which are coupled with pin connector 69 via lead 123. Stored in identification register 118 is a binary representation of the module plug identification number unique to the type of module plug 60. Rating plug 64 is also coupled with microprocessor 110 by a lead 124 and a pin connector 125.

Referring to FIGS. 3 and 4, module plug 60 and electronic trip unit 22 function as follows. Control program 116 instructs microprocessor 110 to perform a process 200, which is started when microprocessor 110 is first booted up (block 202). An operator (not shown) plugs module plug 60 into pin connector 69, which couples module plug 60 with microprocessor 110. Control program 116 instructs microprocessor 110 to periodically read identification register 118 located at module plug 60 (block 204). Control program 116 determines whether a new identification number is present (block 206). If a new identification number is not present, control program 116 instructs microprocessor 110 to read identification register 118 (block 204). If a new identification number is present, then control program 116 instructs microprocessor 110 to compare the identification number read from identification register 118 with the identification numbers listed in lookup table 121 and determine the program 120 associated with the identification number (block 208). Control program 116 then instructs microprocessor to retrieve and execute the associated program 120 (block 210).

Depending on which program 120 is accessed, program 120 will instruct microprocessor 110 to perform steps necessary to operate functions of module plug 60 (block 212). Such functions include accepting input from module plug 60, such as reading input values from dials 66, and providing output data to module plug 60, such as providing signals to display 68. Some examples of the functions module plug 60 can perform include displaying the current being measured by electronic trip unit 22, changing the trip parameters stored in remote access memory 112, displaying overload pick-up times, displaying instantaneous tripping values and energy values, and the like. When a specific module plug 60 is not desired, a blank module plug should be connected to electronic trip unit 22 to protect electronic trip unit 22. In addition, microprocessor 110 reads the number associated with the blank module and determines that no additional function is required.

Module plug 60 and electronic trip unit 22 provide the operator with a flexible electronic trip unit. The operator will be able to upgrade the electronic trip unit after purchasing the electronic trip unit. The operator will also be able to change the capability of the electronic trip unit easily by changing the module plug in the electronic trip unit. Thus, additional options and functions can be installed by the operator in the field.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electronic trip unit for a circuit breaker comprising:
a programmed microprocessor;
a module plug in removable communication with said microprocessor, said module plug includes a program identifier; and
a port for receiving said module plug;
wherein said microprocessor recognizes said program identifier and accesses a program external to said module plug based on said program identifier;
wherein said microprocessor responds to said program to perform a function identified by said module plug;
wherein said module plug is selected from the group consisting of: a specific module plug and a blank module plug;
wherein said function includes a blank function;
wherein said specific module plug and said blank module plug are interchangeable at said port; and
wherein said specific module plug and said blank module plug are each adapted for signal communication with said microprocessor.

2. The electronic trip unit of claim 1, further comprising a random access memory in signal communication with said microprocessor.

3. The electronic trip unit of claim 1, further comprising a rating plug in operable communication with said microprocessor.

4. The electronic trip unit of claim 1, wherein said module plug includes a display.

5. The electronic trip unit of claim 1, wherein said module plug includes an operator interface.

6. The electronic trip unit of claim 1, wherein;
said module plug is a blank module plug.

7. A circuit breaker comprising:
an electrical contact;
an operating mechanism arranged to separate said electrical contact;
a trip actuator in operable communication with said operating mechanism;
an electronic trip unit in operable communication with said trip actuator;
wherein said electronic trip unit including:
a programmed microprocessor;
a module plug in removable communication with said microprocessor, said module plug includes a program identifier; and
a port for receiving said module plug;
wherein said microprocessor recognizes said program identifier and accesses a program external to said module plug based on said program identifier; and
wherein said microprocessor responds to said program to perform a function identified by said module plug;
wherein said module plug is selected from the group consisting of: a specific module plug and a blank module plug;
wherein said function includes a blank function;
wherein said specific module plug and said blank module plug are interchangeable at said port; and
wherein said specific module plug and said blank module plug are each adapted for signal communication with said microprocessor.

8. The circuit breaker of claim 7, further comprising a random access memory in signal communication with said microprocessor.

9. The circuit breaker of claim 7, further comprising a rating plug in operable communication with said microprocessor.

10. The circuit breaker of claim 7, wherein said module plug includes a display.

11. The circuit breaker of claim 7, wherein said module plug includes an operator interface.

12. A method of operating an electronic trip unit, said method comprising:
starting a programmed microprocessor;
identifying a module plug in removable communication with said microprocessor, said module plug including a program identifier;
determining via a signal communication with said module plug whether said module plug is a blank module plug, said blank module plug being responsive to said signal communication via a return signal communication;
determining a program external to said module plug and identified by said program identifier;
retrieving and executing said program to perform a function identified by said module plug; and
in response to said module plug being a blank module plug, digitally denying access to an otherwise available function.

13. The method of claim 12, wherein said identifying a module plug further comprises reading a number stored at an identification register at said module plug.

14. The method of claim 13, wherein said determining a program further comprises comparing said number with a plurality of numbers at a look-up table.

15. An electronic trip unit for a circuit breaker comprising:
a programmed microprocessor;
a module plug in removable communication with said microprocessor; and
wherein said microprocessor includes:
means for digitally identifying said module plug,
means for digitally identifying whether said module plug is a blank module plug,
means for receiving a digital return signal from said blank module plug in response to an identification inquiry,
means for determining a program external to and associated with said module plug,
means for retrieving and executing said program to perform a function identified by said module plug, and
means for digitally denying access to an otherwise available function in response to said module plug being a blank module plug.

16. The electronic trip unit of claim 15, wherein said module plug includes a display.

17. The electronic trip unit of claim 15, wherein said module plug includes an operator interface.

* * * * *